Sept. 25, 1962 J. P. VICKERY 3,055,577
PRESSURE EXCHANGER CELL-RING HAVING
ENERGY CONVERSION MEANS
Filed Nov. 12, 1959
2 Sheets-Sheet 2

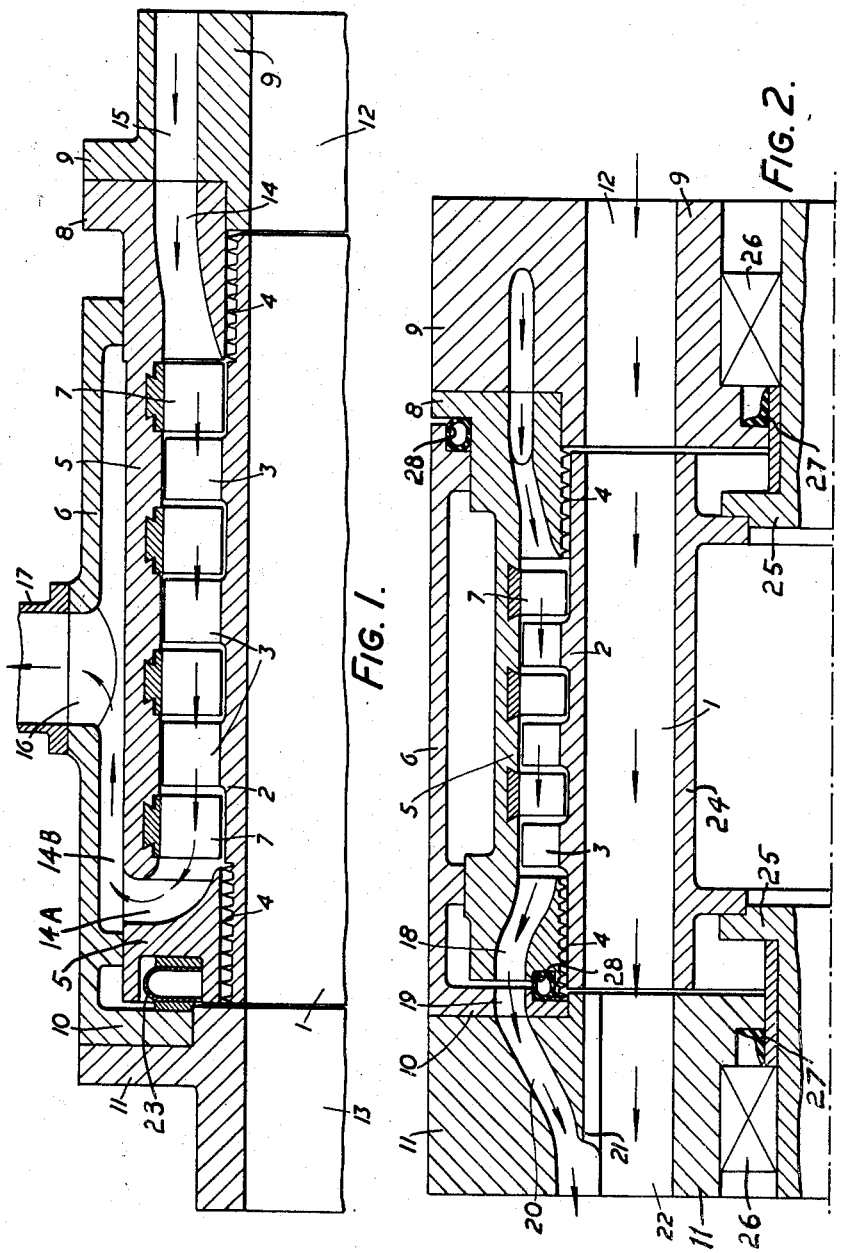

INVENTOR
JOHN P. VICKERY
BY
Larson and Taylor
ATTORNEY

United States Patent Office 3,055,577
Patented Sept. 25, 1962

3,055,577
PRESSURE EXCHANGER CELL-RING HAVING ENERGY CONVERSION MEANS
John P. Vickery, Farnborough, England, assignor to Power Jets (Research & Development) Limited, London, England, a British company
Filed Nov. 12, 1959, Ser. No. 852,526
Claims priority, application Great Britain Nov. 25, 1958
1 Claim. (Cl. 230—116)

This invention relates to pressure exchangers.

The term "pressure exchanger" is used herein to mean apparatus comprising cells in which one working-fluid quantity expands so compressing another working-fluid quantity with which it is in direct contact, ducts to lead working-fluid substantially steadily to and from the cells at different pressures, and means to effect relative motion between the cells and the ducts. The cells, in the present instance, are mounted on a rotor customarily termed a cell ring.

It has already been suggested to render a pressure exchanger cell ring self-driving by making the customarily radial cell walls with a curvature in the manner of a turbine blade. Whilst this arrangement has a number of advantages, it may also suffer from some disadvantages, notably a loss of efficiency both as a pressure exchanger and as a turbine resulting from inlet and exhaust losses, and, in certain instances, difficulty in manufacture.

According to the present invention a pressure exchanger comprises a series of open-ended cells arranged in a ring, a shroud surrounding the cells, means defining common stationary end-plates for the cells and having ports therein, ducts communicating with the cells at the ports in the end-plates, means defining two cylindrical tubular members each secured to one of the end-plates and the tubular members being in telescopic relationship the one to the other, the inner one of the tubular members and the shroud of the cell ring together defining an annular passage, means defining a labyrinth seal at each end of the passage between the shroud and the inner tubular member, a row of axial-flow energy conversion blades extending outwardly from the shroud of the cell ring into the said annular passage and a row of axial-flow stator blades extending inwardly from the inner tubular member and in operative relationship with the row of rotor blades, the whole being arranged so that working-fluid in the energy conversion means is in thermal contra-flow with working fluid in adjacent cells.

End-plate structure may incorporate inlet and outlet ducts to lead working-fluid to and from the energy conversion blades. An outlet duct to lead working-fluid from the energy conversion blades may communicate with a low-pressure scavenging stage outlet duct of the pressure exchanger circuit and serve as an ejector to assist scavenging of the cells at that stage.

The invention will now be described, by way of example, with reference to the accompanying diagrammatic drawings, in which:

FIGURE 1 is a part-section of a pressure exchanger embodying energy conversion means in the form of a turbine;

FIGURE 2 is a half-section of a modified form of FIGURE 1; and

Figure 3:
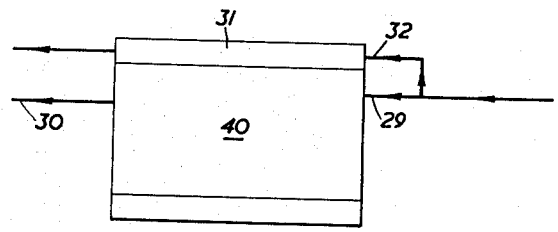
FIGURES 3, 4 and 5 are circuit diagrams of pressure exchangers according to the invention.

Referring to FIGURE 1, the pressure exchanger includes a rotary cell ring having radial cell walls, one of which is shown at 1, and a shroud 2 on which there are mounted three rows of energy conversion blades in the form of radially extending turbine blades 3. At each end of the rotor shroud 2, labyrinth seals 4 are provided.

The rotor is encased by stationary structure including two telescoping tubes 5 and 6, as described in United States patent specification No. 2,779,530, the inner tube 5 carrying four rows of guide blades 7. The inner tube 5 has a flange 8 by which it is secured to an end-plate 9 and similarly the outer tube 6 has a flange 10 by which it is secured to another end-plate 11. A resilient annular seal 23 of U cross-section is secured to the inner tube 5 and the flange 10 of the outer tube 6. The end-plates 9 and 11 have ports 12 and 13 respectively through which working-fluid can enter or leave the cells as the case may be. The exact arrangement of the ports depends on the purpose of the particular pressure exchanger. The inner tube 5 and the end-plate 9 have aligned ducts 14 and 15 leading from a source of working-fluid to the turbine blades.

Exhaust gases leaving the last row of guide blades 7 pass to ducts 14A (only one of which is shown) and thence to an annular duct 14B between the inner tube 5 and the outer tube 6. A number of outlet ports 16 (only one of which is shown) in the outer tube 6 connect the annular duct 14B with an exhaust duct 17.

In operation, the pressure exchanger cell ring operates in a manner consistent with the arrangement of the inlet and outlet ports 12 and 13. Working-fluid enters the ducts 15 and 14 and impinges successively on the turbine blade rows 3. The cell ring is rotated thereby and, if the working-fluid is cool, this fluid serves at the same time to cool the shroud 2 of the cell ring. The exhaust fluid from the turbine passes via the ducts 14A and the annular duct 14B to the ports 16 and the exhaust ducts 17. Leakage of fluid between the turbine and the cell ring is reduced by the labyrinth seals 4.

In the embodiment of FIGURE 2 like parts are given the same references as the corresponding parts of FIGURE 1. Instead of passing out of the pressure exchanger through the ports 16, the turbine exhaust passes through ducts 18 in the inner tube 5, ducts 19 in the flange 10 and ducts 20 in the end-plate 11. In the drawing only one each of the ducts 18, 19 and 20 is shown. Some of the ducts 20 terminate as an ejector 21 in an exhaust duct 22 of the low-pressure scavenging stage of the pressure exchanger. Resilient annular seals 28 which when undeformed are of annular cross-section are provided between the inner tube 5 and the flange 10 of the outer tube 6 and between the outer tube 6 and the flange 8 of the inner tube 5.

FIGURE 2 also shows additional structure not shown in FIGURE 1 and this comprises an inner drum 24 of the cell ring which is mounted upon shafts 25 which shafts 25 are supported in bearings 26 carried in the inner portions of the end-plates 9 and 11. Sealing means 27 are provided between the shafts 25 and the inner portions of the end-plates 9 and 11.

The embodiment of FIGURE 2 operates in a manner similar to that of the embodiment of FIGURE 1, but in this embodiment exhaust fluid from the turbine leaves through the ducts 18, 19 and 20 and is used to produce an ejector effect in the low-pressure scavenging stage exhaust duct 22.

In the arrangement shown in FIGURE 3 a pressure exchanger cell-ring 40, has inlet and outlet ducts 29 and 30 respectively and a peripheral turbine 31. The turbine 31 is fed, via an inlet 32, with working-fluid from the same source as that which feeds the high-pressure fluid inlet duct 29 of the cell-ring.

Figure 4:
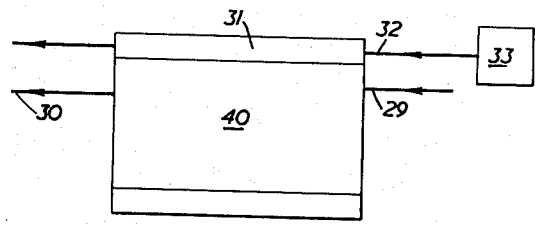

In the arrangement of FIGURE 4 the turbine inlet 32 is fed with working-fluid from an outside source 33.

Figure 5:
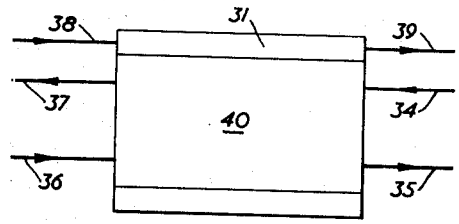

In the circuit shown in FIGURE 5 a cell-ring 40 has hot gas inlet and outlet ducts 34 and 35 respectively and relatively cold gas inlet and outlet ducts 36 and 37 respectively. A turbine inlet 38, which conveys a relatively hot working fluid, is arranged adjacent the colder end of the cells, whilst the turbine outlet 39, which conveys a relatively cold working-fluid, is arranged adjacent the hotter end of the cells. In this case the working-fluids of the cell-ring and the turbine are said to be in "thermal contra-flow."

I claim:

A pressure exchanger comprising a series of open-ended cells arranged in a ring, a shroud surrounding the cells, means defining common stationary end-plates for the cells and having ports therein, ducts communicating with the cells at the ports in the end-plates, means defining two cylindrical tubular members each secured to one of the end-plates and the tubular members being in telescopic relationship the one to the other, the inner one of the tubular members and the shroud of the cell ring together defining an annular passage, means defining a labyrinth seal at each end of the passage between the shroud and the inner tubular member, a row of axial-flow energy conversion blades extending outwardly from the shroud of the cell ring into the said annular passage and a row of axial-flow stator blades extending inwardly from the inner tubular member and in operative relationship with the row of rotor blades, the whole being arranged so that working fluid in the energy conversion means is in thermal contra-flow with working-fluid in adjacent cells.

References Cited in the file of this patent

UNITED STATES PATENTS

| 2,308,233 | Schutte | Jan. 12, 1943 |
| 2,665,058 | Kantrowitz | Jan. 5, 1954 |
| 2,779,530 | Jendrassik | Jan. 29, 1957 |

FOREIGN PATENTS

| 1,148,082 | France | Dec. 3, 1957 |